(12) United States Patent
Sezai

(10) Patent No.: US 12,681,139 B2
(45) Date of Patent: Jul. 14, 2026

(54) RANGE MEASUREMENT DEVICE, RANGE MEASUREMENT METHOD, AND STORAGE MEDIUM

(71) Applicant: Japan Aerospace Exploration Agency, Chofu (JP)

(72) Inventor: Toshihiro Sezai, Chofu (JP)

(73) Assignee: Japan Aerospace Exploration Agency (JP)

( * ) Notice: Subject to any disclaimer, the term of this patent is extended or adjusted under 35 U.S.C. 154(b) by 706 days.

(21) Appl. No.: 17/918,274

(22) PCT Filed: Nov. 8, 2021

(86) PCT No.: PCT/JP2021/041046
§ 371 (c)(1),
(2) Date: Oct. 11, 2022

(87) PCT Pub. No.: WO2022/097748
PCT Pub. Date: May 12, 2022

(65) Prior Publication Data
US 2023/0168340 A1     Jun. 1, 2023

(30) Foreign Application Priority Data

Nov. 9, 2020     (JP) ................................. 2020-186766

(51) Int. Cl.
*G01S 7/35* (2006.01)
*G01S 13/34* (2006.01)

(52) U.S. Cl.
CPC .............. *G01S 7/352* (2013.01); *G01S 13/34* (2013.01)

(58) Field of Classification Search
CPC ........ G01S 7/352; G01S 13/34; G01S 13/343; G01S 13/006; G01S 13/02; G01S 17/34
See application file for complete search history.

(56) References Cited

U.S. PATENT DOCUMENTS

| | | | | |
|---|---|---|---|---|
| 6,529,794 B1* | 3/2003 | Storck | ..................... | G01S 13/34 |
| | | | | 702/194 |
| 6,657,577 B1* | 12/2003 | Gregersen | ................ | G01V 3/12 |
| | | | | 343/793 |
| 10,859,691 B2* | 12/2020 | Sharma | ................ | H01Q 19/106 |

(Continued)

FOREIGN PATENT DOCUMENTS

| | | | | | |
|---|---|---|---|---|---|
| CN | 104515990 A | * | 4/2015 | ........... | G01S 13/931 |
| DE | 102007008944 A1 | | 9/2007 | | |

(Continued)

OTHER PUBLICATIONS

CN104515990A_Description_Dec. 5, 2024_1611_edit.pdf— translation of CN104515990A with formula included (Year: 2015).*

(Continued)

*Primary Examiner* — Yonghong Li
(74) *Attorney, Agent, or Firm* — OSTROLENK FABER LLP

(57)     ABSTRACT

A range measurement device includes a signal processor configured to fit an intermediate frequency signal, obtained by mixing continuous waves which have been frequency-modulated and transmitted toward targets and continuous waves which have been reflected by the targets and returned, with exponential functions whose arguments have real parts and imaginary parts using Prony method.

6 Claims, 3 Drawing Sheets

(56) References Cited

U.S. PATENT DOCUMENTS

| | | |
|---|---|---|
| 2019/0295319 A1 | 9/2019 | Pham et al. |
| 2020/0041640 A1 | 2/2020 | Heinen |
| 2020/0379082 A1 | 12/2020 | Sezai |

FOREIGN PATENT DOCUMENTS

| | | |
|---|---|---|
| GB | 2575751 A | 1/2020 |
| JP | 04036679 A | 2/1992 |
| JP | 04072588 A | 3/1992 |
| JP | 2006071618 A | 3/2006 |
| JP | WO 2018/174172 A1 | 9/2018 |
| JP | 2019101004 A | 6/2019 |
| JP | 2019168255 A | 10/2019 |
| WO | WO 2019/183278 A1 | 9/2019 |
| WO | WO 2019/211923 A1 | 11/2019 |

OTHER PUBLICATIONS

CN104515990A_Description_Dec. 5, 2024_1611.pdf—translation of CN104515990A (Year: 2015).*

M. Bouchard, D. Gingras, Y. de Villers and D. Potvin, "High Resolution Spectrum Estimation of FMCW Radar Signals," IEEE Seventh SP Workshop on Statistical Signal and Array Processing, Quebec City, QC, Canada, 1994, pp. 421-424, doi: 10.1109/SSAP. 1994.572532. (Year: 1994).*

G. Y. Taflan and H. Gökalp, "Reducing effect of in band interference in FMCW channel data using Doppler pre-filtered prony model- ling," 2016 24th Signal Processing and Communication Application Conference (SIU), Zonguldak, Turkey, 2016, pp. 621-624, doi: 10.1109/SIU.2016.7495817. (Year: 2016).*

Reducing_effect_of_in_band_interference_prony_modelling_translate. pdf (Year: 2016).*

Extended European Search Report dated Apr. 2, 2024 issued in corresponding European Application No. 21889299.0.

Bouchard M. et al: "High Resolution Spectrum Estimation of FMCW Radar Signals", IEEE Seventh SP Workshop on Statistical Signal and Array Processing, Jan. 1, 1994 (Jan. 1, 1994), pp. 421-424, XP093142590, DOI: 10.1109/SSAP.1994.572532, Retrieved from the Internet: URL:https://ieeexplore.ieee.org/stampPDF/getPDF. jsp?tp-&arnumber=572532&ref=>.

Thomas Null C.: "Novel Techniques for Processing Data with an FMCW radar", (2013), pp. 1-111, XP093142587, Retrieved from the Internet: URL:https://scholarsjunction.msstate.edu/cgi/viewcontent. cgi?article=4318&context=td [retrieved on Mar. 18, 2024].

Cesar Iovescu et al., The fundamentals of millimeter wave radar sensors, Texas Instruments, retrieved on Sep. 23, 2020.

Tiling Hu et al., Application of Prony's Method to high range resolution radar, 2006 Joint 31st International Conference on Infra- red Millimeter Waves and 14th International Conference on Teraherz Electronics, 2006, p. 316.

International Search Report mailed Dec. 28, 2021 in corresponding PCT International Application No. PCT/JP2021/041046.

Office Action mailed Jul. 5, 2022, in corresponding Japanese Application No. 2020-186766.

* cited by examiner

INFORMATION OF TARGET

| RANKING | RELATIVE STRENGTH [dB] | RANGE [m] |
|---|---|---|
| 1 | 0.000 | 11.007 |
| 2 | −0.284 | 11.176 |
| 3 | −22.160 | 16.221 |
| 4 | −22.738 | −126.646 |
| 5 | −23.385 | 53.128 |

RANGE MEASUREMENT DEVICE, RANGE MEASUREMENT METHOD, AND STORAGE MEDIUM

REFERENCES TO RELATED APPLICATIONS

The present application is a 35 U.S.C. § 371 national stage application of PCT/JP2021/041046, filed Nov. 8, 2021, which claims priority to Japanese Patent Application No. 2020-186766, filed Nov. 9, 2020, the contents of which are incorporated herein by reference.

TECHNICAL FIELD

The present invention relates to a range measurement device, a range measurement method, and a program.

BACKGROUND ART

Frequency modulated continuous wave (FMCW) radar transmits radio waves that are modulated so that a frequency changes linearly with time toward targets. Echo radio waves reflected by the targets and returned to the radar are mixed with the transmitted radio waves and converted into an intermediate frequency signal. The intermediate frequency signal is transformed into a spectral signal by a Fourier transform. Because a frequency of the spectral signal and a range to the target are in a proportional relationship, the range to the target can be measured by detecting a frequency at which a spectrum has a peak value. The above is the principle of range measurement in the FMCW radar. At this time, assuming that the frequency change width is $\Delta f$, the range resolution $\Delta d$ is given by $\{c/(2\Delta f)\}$. Here, c denotes the speed of light (see, for example, Non-Patent Literature 1).

CITATION LIST

Non-Patent Literature

[Non-Patent Literature 1]
"The fundamentals of millimeter wave radar sensors," TEXAS INSTRUMENTS, [online], [retrieved on Sep. 23, 2020], <URL: https://www.ti.com/jp/lit/jajy058>

SUMMARY OF INVENTION

Technical Problem

However, in the prior art, the range to the target is measured in units of range resolution as described in Non-Patent Literature 1. Thus, in the prior art, there is a problem that range measurement accuracy and resolution are limited to the value determined from a frequency change width of FMCW radar.

The present invention has been made in view of the above-described problem and an objective of the present invention is to provide a range measurement device, a range measurement method, and a program capable of improving measurement accuracy and resolution according to the value determined from a frequency change width of transmitted radio waves.

Solution to Problem

According to an aspect of the present invention for accomplishing the above-described objective, there is provided a range measurement device including: a signal processor configured to fit an intermediate frequency signal, obtained by mixing continuous waves which have been frequency-modulated and transmitted toward targets and continuous waves which have been reflected by the targets and returned, with exponential functions whose arguments have real parts and imaginary parts using Prony method.

Also, in the range measurement device according to the aspect of the present invention, the signal processor may extract exponential functions whose absolute values of the real parts are smaller than or equal to a prescribed value from exponential functions obtained in the fitting process.

Also, in the range measurement device according to the aspect of the present invention, the signal processor may acquire values of amplitudes and values of the imaginary parts from the extracted exponential functions.

Also, in the range measurement device according to the aspect of the present invention, the signal processor may acquire values of relative amplitudes of the targets and values of ranges from exponential function information including the values of the amplitudes and the values of the imaginary parts that have been acquired.

Also, the range measurement device according to the aspect of the present invention may further include a display configured to display target information including the values of the relative amplitudes and the values of the ranges that have been acquired.

According to an aspect of the present invention for accomplishing the above-described objective, there is provided a range measurement method including fitting, by a computer, an intermediate frequency signal, obtained by mixing continuous waves which have been frequency-modulated and transmitted toward targets and continuous waves which have been reflected by the targets and returned, with exponential functions whose arguments have real parts and imaginary parts using Prony method.

According to an aspect of the present invention for accomplishing the above-described objective, there is provided a program for causing a computer to fit an intermediate frequency signal, obtained by mixing continuous waves which have been frequency-modulated and transmitted toward targets and continuous waves which have been reflected by the targets and returned, with exponential functions whose arguments have real parts and imaginary parts using Prony method.

Advantageous Effects of Invention

According to the present invention, measurement accuracy and resolution can be improved according to the value determined from a frequency change width of transmitted radio waves.

DESCRIPTION OF EMBODIMENTS

Hereinafter, embodiments of the present invention will be described with reference to the drawings. Also, in the following example, an example in which a range measurement device is applied to a radar device will be described.

<Example of Configuration of Range Measurement Device>

Figure 1:
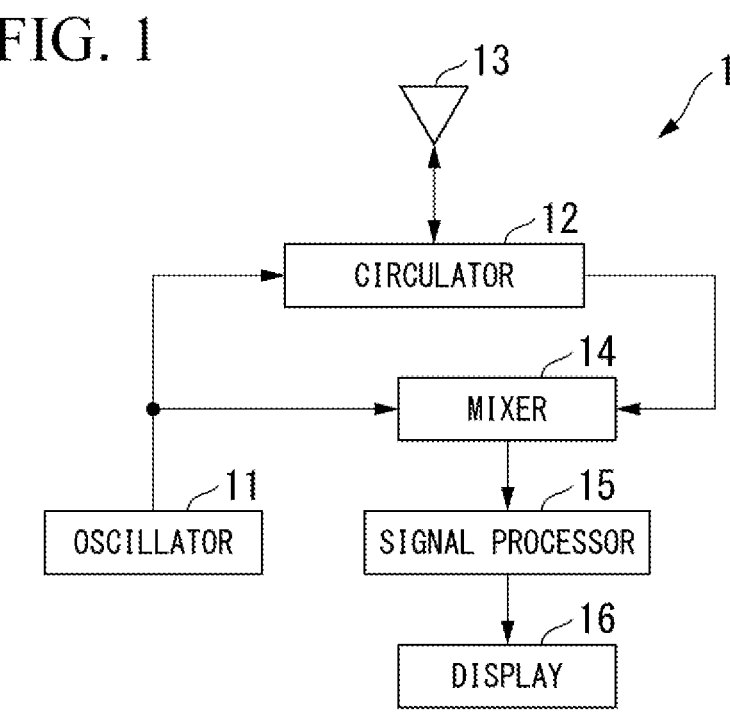
FIG. 1 is a block diagram showing an example of a configuration of a range measurement device according to an embodiment.

FIG. 1 is a block diagram showing an example of a configuration of a range measurement device according to the present embodiment. As shown in FIG. 1, a range measurement device 1 includes an oscillator 11, a circulator 12, an antenna 13, a mixer 14, a signal processor 15, and a display 16.

The range measurement device 1 is, for example, an FMCW radar device, and measures ranges to targets by transmitting radio waves toward the targets and processing an intermediate frequency signal obtained by mixing radio waves which are reflected by the targets and returned to the radar and radio waves which are transmitted.

The oscillator 11 outputs radio waves that are modulated so that a frequency linearly changes with time to the circulator 12 and the mixer 14.

The circulator 12 outputs radio waves input from the oscillator 11 to the antenna 13. Also, the circulator 12 outputs radio waves input from the antenna 13 to the mixer 14.

The antenna 13 radiates radio waves input from the circulator 12 toward the targets, receives the echo radio waves that are scattered by the targets and returned, and outputs the echo radio waves to the circulator 12. The antenna 13 can be any antenna such as a dipole antenna, a horn antenna, a parabolic antenna, or an array antenna.

The mixer 14 outputs an intermediate frequency signal obtained by mixing the radio waves input from the oscillator 11 and the radio waves input from the circulator 12 to the signal processor 15.

The signal processor 15 performs prescribed signal processing and outputs values of relative amplitudes of the targets and values of ranges to the display 16.

The display 16 is, for example, a liquid crystal display device, an organic electro-luminescence (EL) display device, or the like, and displays information about the relative strength of the targets and the ranges based on the output from the signal processor 15.

<Example of Configuration of Signal Processor 15>

Figure 2:
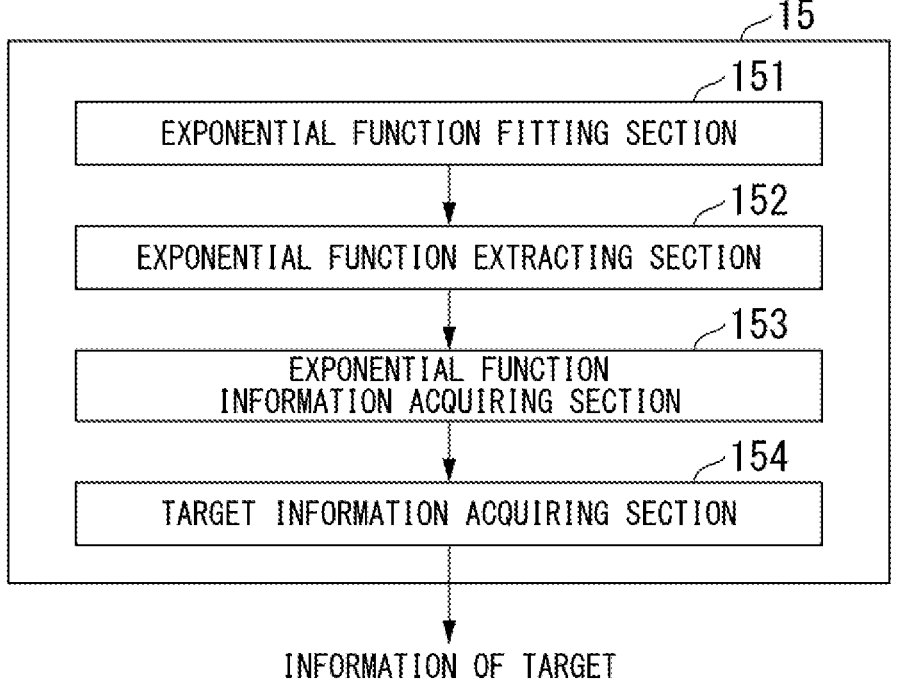
FIG. 2 is a block diagram showing an example of a configuration of a signal processor according to an embodiment.

Next, an example of a configuration of the signal processor 15 will be described. FIG. 2 is a block diagram showing an example of a configuration of a signal processor according to the present embodiment. As shown in FIG. 2, the signal processor 15 includes an exponential function fitting section 151, an exponential function extracting section 152, an exponential function information acquiring section 153, and a target information acquiring section 154.

The exponential function fitting section 151 fits an input intermediate frequency signal with exponential functions whose arguments have real parts and imaginary parts using Prony method. The Prony method is a method of fitting a data series with exponential functions.

The exponential function extracting section 152 extracts exponential functions whose absolute values of the real parts are smaller than or equal to a prescribed value from exponential functions obtained in the fitting process.

The exponential function information acquiring section 153 acquires values of amplitudes and values of imaginary parts from the extracted exponential functions.

The target information acquiring section 154 acquires values of relative amplitudes of the targets and values of ranges from acquired exponential function information.

<Range Measurement Method>

Next, an example of a range measurement method will be described.

FMCW radar transmits radio waves that are modulated so that a frequency of the transmitted radio waves linearly changes with time toward the targets. A frequency $f_T(t)$ of the transmitted radio waves is expressed by the following Eq. (1).

[Math. 1]

$$f_T(t) = f_0 + \frac{\Delta f}{T_c} t \tag{1}$$

In Eq. (1), t denotes time, $f_0$ denotes a carrier frequency, c denotes the speed of light, $\Delta f$ denotes a frequency change width, and $T_c$ denotes a time period for changing the frequency.

Because an echo signal of the target located at a range $R_k$ from the radar reaches the radar after a time period of $(2R_k)/c$, its frequency $f_{R_k}(t)$ is expressed by the following Eq. (2).

[Math. 2]

$$f_{R_k}(t) = f_0 + \frac{\Delta f}{T_c}\left(t - \frac{2R_k}{c}\right) \tag{2}$$

Because the FMCW radar uses an intermediate frequency signal in which a transmitted signal and an echo signal are mixed, its frequency $f_k(t)$ is the difference frequency between $f_T(t)$ and $f_{R_k}(t)$ and is expressed by the following Eq. (3).

[Math. 3]

$$f_k(t) = f_T(t) - f_{R_k}(t) = \frac{2\Delta f}{T_c c} R_k \tag{3}$$

As shown in Eq. (3), $f_k(t)$ denotes a constant value regardless of time t. Assuming that this value is $F_k$, the range $R_k$ can be obtained using the following Eq. (4).

[Math. 4]

$$R_k(t) = \frac{T_c c}{2\Delta f} F_k \tag{4}$$

Also, the intermediate frequency signal $S_{IF}(t)$ is expressed by the following Eq. (5) when $F_k$ is used.

[Math. 5]

$$S_{IF}(t) = A_k \exp(j2\pi F_k t) \tag{5}$$

5

6

In Eq. (5), j denotes an imaginary unit and $\dot{A}_k$ denotes an amplitude. Also, Eq. (5) is an intermediate frequency signal when there is one target.

Generalizing this, an intermediate frequency signal for p targets is given by the following Eq. (6).

[Math. 6]

$$S_{IF}(t) = \sum_{k=1}^{p} \dot{A}_k \exp(j2\pi F_k t) \tag{6}$$

From Eq. (6), it can be seen that the intermediate frequency signal used in the FMCW radar is a sum of exponential functions. A signal that is actually obtained is a data series including numerical values. For example, Prony method is known as the method of fitting a data series with exponential functions. Because the intermediate frequency signal used in the FMCW radar is the sum of the exponential functions, if this is fitted to the exponential functions using Prony method, the amplitude $\dot{A}_k$ and $F_k$, which are parameters of the exponential function, can be obtained.

Different from the conventional method which measures ranges in units of the range resolution determined by the frequency change width, the method using Eq. (6) obtains the range $R_k$ of the target by digit number directly. Therefore, the method can measure the range accurately.

However, Eq. (6) is an equation of an ideal case, the actual intermediate frequency signal contains noise, so that a signal $\hat{S}_{IF}$ obtained by fitting using Prony method is expressed by the following Eq. (7).

[Math. 7]

$$\hat{S}_{IF}(t) = \sum_{k=1}^{p} \dot{A}_k \exp\{(\alpha_k + j2\pi F_k)t\} \tag{7}$$

When the actual intermediate frequency signal is fitted using Prony method, $\alpha_k$ is also obtained in addition to the amplitude $\dot{A}_k$ and $F_k$. As shown in Eq. (6), $\alpha_k$ with respect to the target is 0 in the ideal case. Thus, when a signal containing noise is fitted using Prony method, $\alpha_k$ with respect to the target is considered to be a small value even if it is not 0. On the other hand, $\alpha_k$ with respect to noise is not always a small value, but is considered to be any value. Therefore, depending on a magnitude of $\alpha_k$, it is possible to efficiently extract the exponential functions for the targets from the obtained exponential functions by removing a part of the exponential functions for noise.

<Range Measurement Method>

Figures 3, 4:
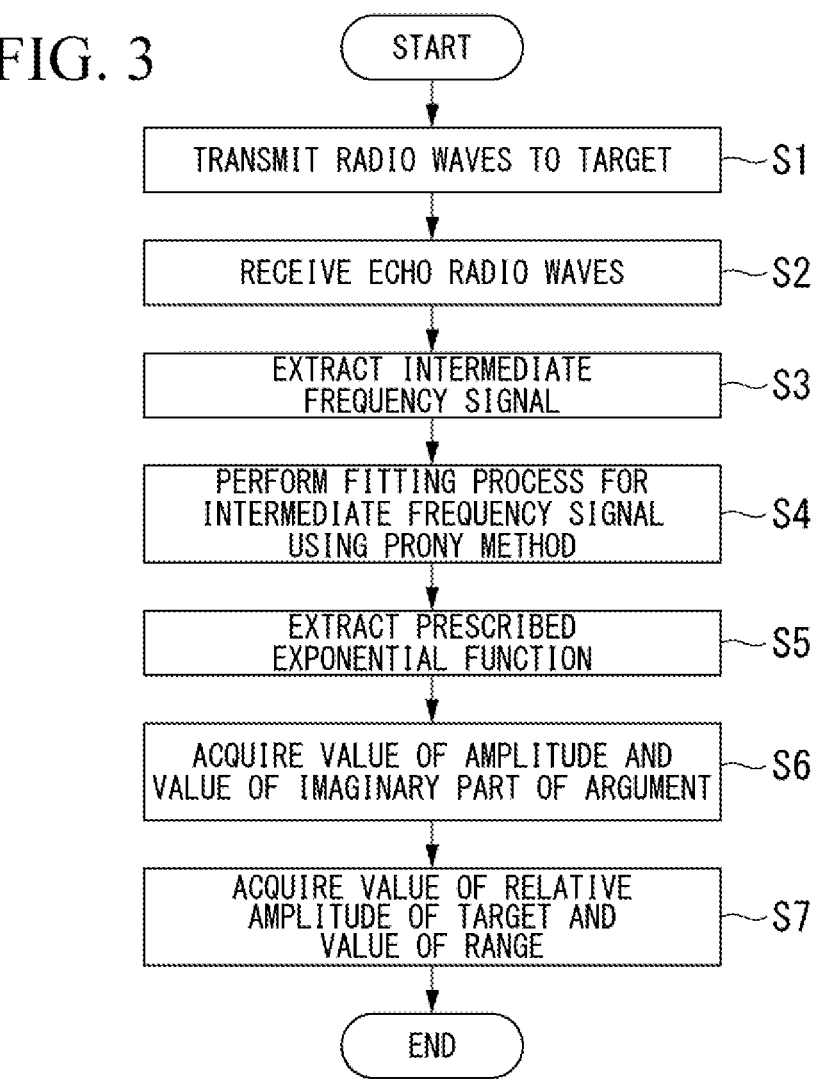
FIG. 3 is a flowchart of a range measurement processing procedure according to an embodiment.
FIG. 4 is a diagram showing information of five higher-ranked relative amplitudes within target information obtained by a simulation.

Next, an example of a range measurement processing procedure will be described. FIG. 3 is a flowchart of the range measurement processing procedure according to the present embodiment.

(Step S1) The antenna 13 radiates radio waves input from the circulator 12 toward targets.

(Step S2) The antenna 13 receives echo radio waves that are scattered by the targets and returned.

(Step S3) The mixer 14 extracts an intermediate frequency signal obtained by mixing radio waves input from the oscillator 11 and radio waves input from the circulator 12.

(Step S4) The exponential function fitting section 151 fits the extracted intermediate frequency signal with exponential functions whose arguments have real parts and imaginary parts using Prony method.

(Step S5) The exponential function extracting section 152 extracts exponential functions whose absolute values of the real parts in the arguments are smaller than or equal to a prescribed value from exponential functions obtained in the fitting process.

(Step S6) The exponential function information acquiring section 153 acquires values of the amplitudes and values of imaginary parts of the arguments from the extracted exponential functions.

(Step S7) The target information acquiring section 154 acquires values of relative amplitudes of targets and values of ranges from acquired exponential function information.

Although the FMCW radar has been described in the above example, the present embodiment is not limited thereto. For example, the present embodiment can also be applied to an FMCW LIDAR, which uses a LIDAR (laser radar) instead of a radar, or the like. The radar uses radio waves, but the LIDAR uses laser light. As described above, a medium to be transmitted and received by the range measurement device is not limited to a radio wave, and may be an electromagnetic wave of the LIDAR or the like. Further, a medium to be transmitted and received by the range measurement device may be a sound wave. That is, the "frequency-modulated continuous wave" is radio wave, electromagnetic wave, sound wave, or the like.

<Evaluation>

Next, an example of results of a simulation performed to confirm the effect of the method of the present embodiment will be described.

The simulation conditions were that a carrier frequency was 76 [GHz] and radio waves that had been modulated so that the frequency was incremented linearly by 500 [MHz] for 1 [μsec] were transmitted from the FMCW radar. In the simulation, target information that was obtained when the echo radio waves that were scattered from two targets with the same radar scattering cross-section located at ranges of 11.0 [m] and 11.2 [m] from the radar and returned to the radar were acquired in the environment in which a signal to noise ratio was 20 [dB] was studied.

A result of extracting exponential functions whose absolute values of real parts in the arguments are smaller than or equal to 0.001 from exponential functions obtained by fitting an intermediate frequency signal with exponential functions whose arguments have real parts and imaginary parts using Prony method, acquiring relative amplitudes of targets from the amplitude values of the exponential functions, and acquiring ranges to the targets from the imaginary parts in the arguments of the exponential functions is shown in FIG. 4. FIG. 4 is a diagram showing information of five higher-ranked relative amplitudes within target information obtained in the simulation.

Figures 5, 6:
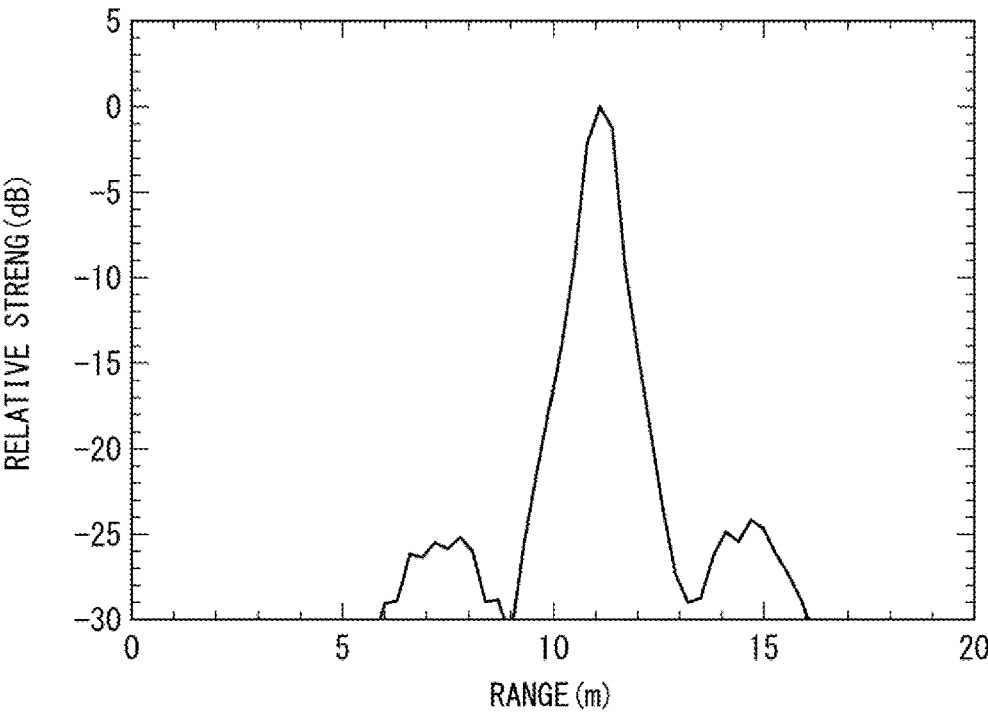
FIG. 5 is a diagram showing a relationship between a range and relative strength obtained by a simulation according to the present embodiment.
FIG. 6 is a diagram showing results of a simulation performed in a conventional method.

A result of illustrating target information up to the range of 20 [m] among the target information obtained in the simulation is shown in FIG. 5. FIG. 5 is a diagram showing a relationship between the range and the relative strength obtained in the simulation in the present embodiment. In FIG. 5, the horizontal axis represents a range [m] and the vertical axis represents relative strength [dB].

From FIG. 4, it can be seen that relative amplitudes of rankings 1 and 2 have a difference of 20 [dB] or more from those of rankings 3, 4, and 5, so that information associated with rankings 1 and 2 is target information and information associated with rankings 3, 4, and 5 is information caused by noise. Accordingly, it can be seen that there are two targets.

The range errors between two-target information and the actual ranges are significantly small as 7 [mm] and 24 [mm]. Also, the difference between the relative amplitudes of the two targets is significantly small as 0.284 [dB].

Because the frequency change width used in the simulation is 500 [MHz], the accuracy and resolution of the range measurement obtained in the conventional method is 0.3 [m]. On the other hand, according to the present embodiment, it is possible to identify two targets close to a range of 0.3 [m] or less as shown in FIGS. 4 and 5. Also, the range error obtained for the two targets is 24 [mm] at the maximum, which is less than one-tenth of the range measurement accuracy of the conventional method. From these, according to the present embodiment, the number of targets, the range, and the relative amplitude can be obtained without being limited to the value determined from the frequency change width of the FMCW radar system.

Here, a comparative example will be described. FIG. 6 is a diagram showing results of a simulation performed by the conventional method. In FIG. 6, the horizontal axis represents a range [m] and the vertical axis represents relative strength [dB]. The simulation conditions are the same as those of the simulation performed to confirm the effect of the method of the present embodiment. As shown in FIG. 6, in the conventional method, it is only known that the target is located in the vicinity of 11.1 [m] and it is impossible to recognize that there are two targets.

As described above, in the present embodiment, fitting a frequency included in intermediate frequency radio waves, obtained by mixing echo radio waves and transmitted radio waves, with exponential functions whose arguments have real parts and imaginary parts using Prony method is performed and the exponential functions whose absolute values of the real parts in the arguments are smaller than or equal to a prescribed value are extracted. In the present embodiment, values of the amplitudes and values of the imaginary parts in the arguments are acquired from the extracted exponential functions and values of relative amplitudes of the targets and values of ranges are acquired from exponential function information acquired.

Thereby, according to the present embodiment, measurement accuracy and resolution can be improved according to the value determined from a frequency change width of transmitted radio waves.

Also, all or some processes to be performed by the range measurement device 1 may be performed by recording a program for implementing some or all functions of the range measurement device 1 according to the present invention on a computer-readable storage medium and causing a computer system to read and execute the program recorded on the storage medium. The "computer system" used here is assumed to include an operating system (OS) and hardware such as peripheral devices. Also, the "computer system" is assumed to include a homepage providing environment (or a displaying environment) when a World Wide Web (WWW) system is used. Also, the "computer-readable storage medium" refers to a storage device such as a flexible disc, a magneto-optical disc, a read-only memory (ROM), a portable medium such as a compact disc-ROM (CD-ROM), and a hard disk embedded in the computer system. Furthermore, a "computer-readable recording medium" is assumed to include a medium for retaining a program for a given period of time such as a volatile memory (RAM) inside a computer system that serves as a server or client when a program is transmitted via a network such as the Internet or a communication circuit such as a telephone circuit.

Also, the above-described program may be transmitted from a computer system storing the program in a storage device or the like to another computer system via a transmission medium or by transmission waves in a transmission medium. Here, the "transmission medium" for transmitting the program refers to a medium which has a function of transmitting information as in a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer system, i.e., a so-called differential file (differential program).

While modes for carrying out the present invention have been described using embodiments, the present invention is not limited to such embodiments in any way and various modifications and replacements can be added without departing from the scope of the present invention.

REFERENCE SIGNS LIST

1 Range measurement device
11 Oscillator
12 Circulator
13 Antenna
14 Mixer
15 Signal processor
16 Display
151 Exponential function fitting section
152 Exponential function extracting section
153 Exponential function information acquiring section
154 Target information acquiring section

The invention claimed is:

1. A range measurement device comprising:
a transmitter configured to transmit, toward targets, a first signal being continuous waves which have been frequency-modulated;
a receiver configured to receive a second signal being the continuous waves which are reflected by the targets and returned from the targets; and
a signal processor configured to:
fit an intermediate frequency signal, obtained by mixing the first signal and the second signal, with exponential functions whose arguments have real parts and imaginary parts using Prony method;
remove the exponential functions whose absolute values of the real parts in the arguments that are greater than a prescribed value, as noise, among the exponential functions obtained by fitting the intermediate frequency signal; and
acquire values of ranges between the range measurement device and the targets based on the exponential functions from which the noise has been removed.

2. The range measurement device according to claim 1, wherein the signal processor is further configured to acquire, from the exponential functions from which the noise has been removed, values of amplitudes of the exponential functions from which the noise has been removed, and values of the imaginary parts of the exponential functions from which the noise has been removed.

3. The range measurement device according to claim 2, wherein the signal processor is further configured to:
acquire top amplitude values from the acquired values of the amplitudes based on the exponential functions from which the noise has been removed, and including the acquired values of the amplitudes and the acquired values of the imaginary parts; and acquire values of ranges between the range measurement device and the targets, the values of ranges corresponding to the acquired values of the imaginary parts of the exponential functions from which the noise has been removed of the top amplitude values.

4. The range measurement device according to claim 3, further comprising a display configured to display target information including the acquired top amplitude values and the acquired values of the ranges.

5. A range measurement method executed by a computer, the range measurement method comprising:

transmitting, by a transmitter of a range measurement device, toward targets, a first signal being continuous waves which have been frequency-modulated;

receiving, by a receiver of the range measurement device, a second signal being the continuous waves which are reflected by the targets and returned from the targets;

fitting an intermediate frequency signal, obtained by mixing the first signal and the second signal, with exponential functions whose arguments have real parts and imaginary parts using Prony method;

removing the exponential functions whose absolute values of the real parts in the arguments that are greater than a prescribed value, as noise, among the exponential functions obtained by fitting the intermediate frequency signal; and acquiring values of ranges between the range measurement device and the targets based on the exponential functions from which the noise has been removed.

6. A computer-readable, non-transitory, storage medium storing a program for causing a computer to execute:

transmitting, by a transmitter of a range measurement device, toward targets, a first signal being continuous waves which have been frequency-modulated;

receiving, a receiver of the range measurement device, a second signal being the continuous waves which are reflected by the targets and returned from the targets;

fitting an intermediate frequency signal, obtained by mixing the first signal and the second signal, with exponential functions whose arguments have real parts and imaginary parts using Prony method;

removing the exponential functions whose absolute values of the real parts in the arguments that are greater than a prescribed value, as noise, among the exponential functions obtained by fitting the intermediate frequency signal; and acquiring values of ranges between the range measurement device and the targets based on the exponential functions from which the noise has been removed.

\* \* \* \* \*